Fig. 1.

P. J. BRYAN.
MEAT CUTTING MACHINE.
APPLICATION FILED JUNE 7, 1915.

1,250,555.

Patented Dec. 18, 1917.
4 SHEETS—SHEET 4.

Witnesses
Martin H. C. Olsen.
Arthur B. Framke.

Inventor
Pulaski J. Bryan
By Geo. E. Waldo
Atty.

UNITED STATES PATENT OFFICE.

PULASKI J. BRYAN, OF CHICAGO, ILLINOIS.

MEAT-CUTTING MACHINE.

1,250,555.  Specification of Letters Patent.  Patented Dec. 18, 1917.

Application filed June 7, 1915. Serial No. 32,606.

*To all whom it may concern:*

Be it known that I, PULASKI J. BRYAN, a citizen of the United States, and resident of Chicago, in the county of Cook and State of Illinois, have invented a new and useful Meat-Cutting Machine, of which the following is a specification.

This invention relates to meat cutting machines and relates particularly to meat cutting machines of the general type which forms the subject matter of U. S. Letters Patent No. 1,130,664, dated March 2, 1915.

A particular object of the present invention is to provide an improved and simplified feed mechanism for the meat supporting table, whereby a wide range of feed may be secured to provide for cutting the meat into slices varying from a small fraction of an inch to almost any desired width, which shall be uniform under all different adjustments and which may be quickly and conveniently changed or adjusted from one feed to another.

A further object of the invention is to provide an improved guide and guard for limiting the movement of the arms, on which the rotary saw and cutter are mounted, to the range of movement contemplated in the designed operation of the machine, and for confining said saw and cutter arms to positions in which they will be conveniently accessible when it is desired to operate the machine.

Still a further object of the invention is to provide certain attachments to and adaptations of the machine, whereby the motor for driving the meat cutter may be utilized for other purposes, as for grinding meat, bones and the like.

To effect the foregoing objects, my invention comprises the various features, combinations of features and details of construction hereinafter described and claimed.

In the accompanying drawings in which my invention is fully illustrated.

Excepting as hereinafter particularly pointed out and described, the cutting and sawing devices of the meat cutter of the present application are substantially the same as the corresponding devices of the machine of said Patent No. 1,130,664, to which, in order to avoid repetition, reference is made for a description thereof.

For purposes of convenient reference, 1 designates the pivoted standard of the machine, 2 and 3, respectively, the arms pivoted to the upper end of said standard on which the saw 4 and cutter 5 are rotatably mounted and which are adapted to be driven by a motor 6 mounted on a bracket 7, below the pivot of said standard 1.

In accordance with my present invention, the movement of the saw 4 and cutter 5 is adapted to be limited by means of a suitable guide guard consisting of an arch shaped metal bar 8, the lower ends of the upright side members of which are secured to brackets 9 rigidly connected to opposite sides of the machine frame and the intermediate horizontal section of which extends transversally of the machine at a distance above the bed thereof. Said bar 8 is positioned a short distance in front of the plane of the saw 4 and cutter 5 and in the path of travel of the hollow arms 10 and 11, in which the shafts for the saw 4 and cutter 5 are rotatably mounted, the space between the uprights side members of said guide guard 8 and the distance of the transverse member thereof above the bed of the machine being such as to permit transverse movement of the saw and cutter entirely across the machine, and vertical movement therof sufficient to clear the largest sized piece of meat, resting on the meat supporting or conveyer table, presently to be described, on which the machine is designed to operate. Also, contact of the sleeve 10, in which the saw shaft is mounted, with the left hand upright member of the guide guard 8, will operate to limit the pivotal movement of the standard 1 and will support the saw and cutter in such positions that the handles for operating same will be conveniently accessible to the operator standing at the front side of the machine. Supported outside of the guide guard 8 is a shield 12, designed to catch any particles of meat or bone which may be thrown off from the saw or cutter by centrifugal force in the operation of the machine, said shield being preferably several inches in width. The lower ends of said shield are secured to the outer sides of the brackets 9 and said shield is supported between its ends by means of brackets 13 which connect said shield with the guide guard 8. Said shield 12 is supported at a distance outside of the guard 8 greater than one half the diameter of the saw 4 or cutter 5, so that said guard will clear the cutting edges of said saw and cutter.

In the operation of the machine, the meat to be cut is supported upon a suitable table comprising a fixed frame, a carrier for the meat in the form of an endless conveyer, and means for imparting step by step movement to said conveyer table. As shown, the frame of said supporting table consists of side frame sections comprising legs 14, the upper ends of which are rigidly connected by longitudinal frame members 15. Said frame sections are preferably made of cast iron and each frame section is cast in a single piece, preferably in the form of angles in cross section. The lower end of the front left hand leg is preferably off-set rearwardly out of the path of oscillation of the motor 6, so as not to interfere with the pivotal movement of the standard 1 in making a cut the full width of the machine.

The side frame sections are rigidly connected between their upper and lower ends by a cross frame member, designated as a whole by 16, which, in the preferable construction shown, is made in the form of what may be designated a spider, comprising arms 17 which radiate from a common supporting plate and the outer ends of which are bolted or otherwise rigidly connected to the legs of the side frames.

The conveyer table designated as a whole A, consists of channel bars 18, the ends of which are rigidly connected to chain belts 19, adjusted to sprocket wheels 20 secured to rotate with shafts 22 and 23 rotatably mounted in suitable bearings at the front and rear ends of the stationary side frame sections of the machine, said channel bars being so positioned that the flat sides of the channel bars which form the upper lap of the table, will be on top. The chain belts 19 are positioned beneath the inwardly projecting flanges of the longitudinal frame members 15, and between the sprocket wheels on the different shafts 22 and 23, the upper laps of said chains resting upon and being supported by flanges 24 formed on the longitudinal members 15 of the side frames beneath the top flanges thereof. Said flanges 24 will operate, in an obvious manner, to prevent sagging of the upper section of the conveyer table A, on which, in the operation of the machine, the meat to be cut is supported.

The present invention also comprises improved and simplified means for imparting step by step movement to the conveyer table A, said means being so constructed that the feed of said conveyer table will admit of very fine adjustment and will be uniform for all different adjustments. As shown, said means consists of a ratchet wheel 25 secured to the front sprocket wheel shaft 22, and a gravity pawl 26 pivoted to a lever 27 one end of which is pivoted to the sprocket wheel shaft 22 and the opposite end connected, by a link 28, with a foot lever 29 pivoted to a forwardly extending bracket 30 on the front right hand leg of the machine adjacent to the lower end thereof, where it can be conveniently operated by the foot. With the described construction, it is obvious that depressing the front end of the foot lever 29 will operate to impart pivotal movement to the lever 27 and, through the pawl 26 and ratchet wheel 25, to the sprocket wheel shaft 22, thereby imparting step by step feed to the conveyer table A, and that the feed of said conveyer table may be adjusted by varying the pivotal movement of the lever 27 on which the pawl 26 is mounted. As shown, the means for thus adjusting the feed of the conveyer table are as follows:—Pivotal movement of the foot lever 29 to retract the pawl lever 27 is limited by a stop pin 31, which projects laterally from the leg of the machine and pivotal movement of said foot lever 29 to advance said pawl lever 27 is limited by means of a stop pin 32, secured in a bar 33, which is movable endwise in a guide slot 34 formed in a block 35 secured to the leg of the machine a short distance above the foot lever 29. Said bar 33 is adapted to be secured in different vertical adjustments by means of a fixed catch 36 on the block 35 which is adapted to interchangeably engage a vertical series of notches 37, formed in the adjacent edge of said bar. To provide for disengaging the notches 37 and the catch 36 from each other, the side of the groove 34 opposite to the catch 36 is cut away, as shown at 38, to provide for retracting the bar 33 to disengage the notches 37 from the catch 36, which will permit said bar and thus the stop 32, to be adjusted either up or down, as it may be desired to increase or decrease the feed of the table A. The bar 33 is adapted to be maintained normally in position with the catch 36 in engagement with the notches 37 by a spring 39, which connects said bar with a rigid part of the machine frame. Vertical adjustment of the stop bar 33 is adapted to be effected by means of a hand lever 40 pivoted between its ends to a bracket 41 on the shield 12 the rear end of which is pivoted to the upper end of the stop bar 33. To provide for retracting the bar 33 to disengage the notches 37 from the catch 36, a slot 42 is formed lengthwise in the lever 40 through which the stud extends by which the lever 40 is pivoted to the bracket 41. When it is desired to change the adjustment of the stop pin 32, the lever 40 is first drawn frontward against the force of the spring 39, thereby disengaging the notches 37 from the catch 36 and said lever is then turned pivotally to raise or lower the stop bar 33 as it is desired to increase or decrease the feed of the conveyer table. When a desired adjustment is secured, the lever 40 is released, and the spring thereupon advances the bar 33 to effect engagement of the catch 36 with a notch 37. For convenience in adjusting the stop bar 33, I preferably provide a gage to indicate the distance which said stop bar is raised or lowered. As shown, said gage consists of graduations, indicated at 43, on the front side of the stop bar 33 adjacent to its upper end, the upper edge of the shield 12 forming a fixed indicator to which the graduations on said stop bar may be referred.

The conveyer table A terminates short of the plane in which the saw 4 and rotary cutter 5 are located, so that during the cutting operation, the meat will overhang said conveyer table, and to support the same during the cutting operation, an auxiliary support is provided. As shown, said auxiliary support consists of a roller 44, the shaft of which is rotatably mounted in suitable bearings formed in lugs 45 on the machine frame. Said roller is small in diameter, say 1½ inches, and it is positioned so that the front side thereof will extend into close proximity to the plane of the saw 4 and cutter 5 and its top side substantially even with the top of the conveyer A. As shown, rotation is imparted to the roller 44 from the sprocket wheel shaft 22, and in the same direction, by means of a chain belt 46 adjusted to sprocket wheels secured to rotate with said sprocket wheel shaft 22 and the shaft of said roller 44.

Said auxiliary meat support also comprises a bar 47 mounted at the upper ends of brackets 48 at the front sides of the saw 4 and cutter 5. Said bar is preferably made of wood and is supported so as to be vertically movable, its normal position being such that the top of said wooden bar 47 will be below the upper side of the roller 44 and of the conveyer table A, and said supporting bar is adapted to be raised to the level of said roller 44 and conveyer table A by suitable mechanism provided for the purpose, during the operation, if desired. As shown, said bar 47 is supported in the following manner:—The brackets 48 on which said bar 47 is mounted are pivoted to the front ends of levers 49, which are secured to rotate with a shaft 50 rotatably mounted in suitable bearings in the side frames of the conveyer table, one at each side of the machine. The brackets 48 are maintained in upright operative position and normally depressed, by means of springs 51 which connect the lower ends thereof with a rigid part of the machine frame, and movement of said brackets is limited by means of stop lugs 52 on the machine frame, which project into the path of travel of rigid shoulders on said brackets. Rotation is adapted to be imparted to the shaft 50 to raise the brackets 48 to bring said bar 47 into operative position by means of a foot lever 53 pivoted at its rear end to a rigid part of the machine frame, as shown to a cross bar 54 which connects the legs of each side frame member adjacent to their lower ends, said foot lever 53 being connected to a rearward extension 55 of the right hand lever 49 by means of a link 56.

With the described construction it is obvious that depressing the lever 53 will operate to raise the bar 47 into operative position, in the manner desired.

In the operation of the machine, the meat to be sliced is fed to the cutting devices by the conveyer table A between guide plates 57 and 58 mounted on the side frames of the conveyer table so as to be movable transversally of said conveyer table, to provide for adjusting the same into close contact with the meat passing between same. As shown, said guide plates 57 and 58 are rigidly secured to the inner ends of bars 59 and 60 which are slidable endwise in grooves formed in bearing blocks 61 and 62 and which are adapted to be secured in any desired adjusted positions by suitable means consisting, as shown, of spring pawls 63 mounted on the blocks 61 and 62, which are adapted to engage ratchet teeth 64 formed in the under sides of said bars, the relation being such that engagement of said pawls with said ratchet teeth will secure said bars against outward movement, but will permit inward movement thereof. When it is desired to adjust the guide plates 57 and 58 outwardly, that is away from each other, the pawls 63 are disengaged from the ratchet teeth 64 whereupon said bars 59 and 60 may be moved outwardly in the manner desired.

The meat to be sliced is adapted to be secured to the table A by means of a clamping dog consisting, as shown, of a bar 65 having a head 66 on its lower end, the width of said head being less and the length of said head greater than the width of the spaces between adjacent slats 18 of the conveyer table A. Fitted to slide freely on said bar 65 is a lateral projecting arm 67, the bearing of said arm on said bar 65 being relatively short and preferably loosely fitted thereto, whereby pressure applied to said arm 67 at a distance from the bar 65 will operate to cock and bind the bearing of said arm on said bar. Formed at the outer end of said arm 67 is a cross piece 68 which is provided with teeth or pins 69 adapted to engage the meat.

With the described construction, it is obvious that said clamping dog may be quickly and conveniently attached to the conveyer table A by turning said clamping dog to permit the head 66 thereof to be inserted through a space of said conveyer table between adjacent slats thereof and again turned to engage the ends thereof beneath adjacent slats of said conveyer table. The arm 67 is then depressed into firm engagement with the piece of meat to be sliced, resting upon the conveyer table A, and pressure applied to the attached end thereof, the resistance offered by the meat to the depression of the outer end of said arm operating to cock and bind the bearing of said arm upon the bar 65 and thus secure the same in position to clamp the meat firmly on said conveyer table A.

Preferably, also, my improved meat cutter comprises means adjacent to the front end of the conveyer table A for clamping the meat to said conveyer table. As shown, said clamping device consists of arms 70 and 71 secured to a block 72, with the arm 71 above and spaced a distance from the arm 70. The block 72 is pivoted to the block 62 secured to the left hand side frame of the conveyer table and is operatively connected to the foot lever 53 by a link 73, which connects an arm 74 on the block 72 with one end of a lever 75, pivoted between its ends to a bracket 76 on the cross frame member 16, the opposite end of said lever 75 being pivotally connected to the lever 56, which operates the auxiliary meat supporting bar 47. The arms 70 and 71 are preferably spring arms, whereby, if one of said arms should come into contact with the meat in advance of the other, it will bend or flex to permit the other arm to engage the meat also. Said arms are provided on their undersides with pins or teeth 77 which will engage the meat and hold the same firmly.

The springs 51 applied to the brackets 48 and the weight of the foot lever 53 will operate, in an obvious manner, to maintain the meat supporting bar normally depressed and the meat clamping arms 70 and 71 normally elevated, depression of said foot lever operating to raise the meat supporting bar 47 and to depress the meat clamping arms 70 and 71.

Said meat supporting bar 47 and the meat clamping arms 70, 71 will not, ordinarily, be used when slicing thin meats which are relatively firm, as bacon and the like, but are designed principally for use when slicing thick meat, as beef steak, which is usually rather soft and is cut relatively thick and which, unless supported, would tend to sag under its own weight and the action of the cutting device, thus resulting in cutting the same thinner at the top edge than at the bottom edge thereof.

In using said meat supporting bar 47 and clamping arms 70 and 71, they are operated intermittently, alternately with the feed mechanism, the foot lever 53 being released after each cut and during the time that the foot lever 29 is operated, and being again depressed to raise the meat supporting bar 47 and to depress the meat clamping arms 70 and 71 into engagement with the meat to be cut, resting on the conveyer table A.

To effect the object of my invention, as it relates to adapting the motor of the meat cutter for other purposes than cutting the meat, the construction of the machine is as follows:—Secured to and preferably cast integral with the cross bar 54 of the left hand side frame member of the conveyer table A is a shelf or bracket 78, said shelf or bracket being preferably formed at the outer ends of arms 79.

Figure 1:
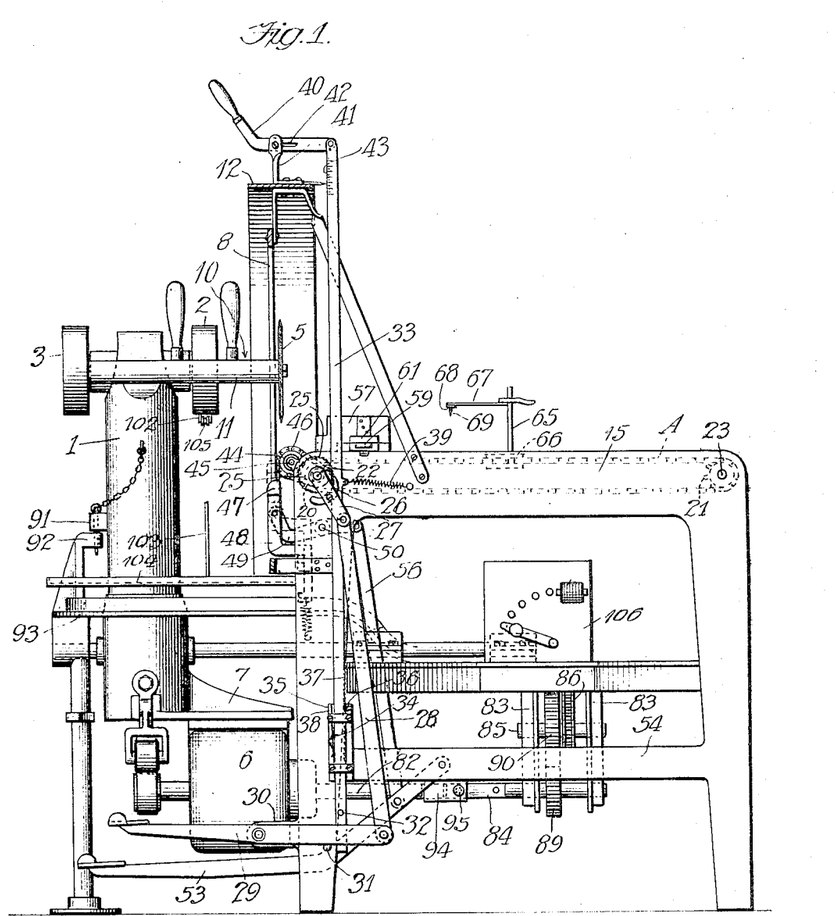
Figure 1 is a side view of the machine, showing the guide guard and shield of the meat cutter and saw in section, so as to expose parts covered thereby.
Figure 2:
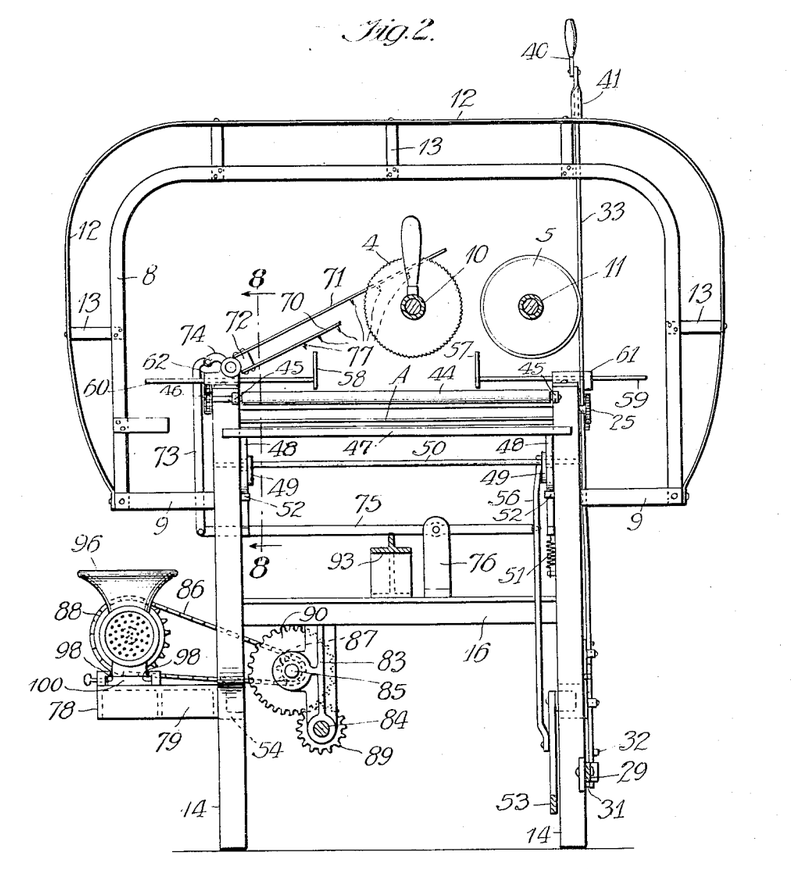
Fig. 2 is a sectional view of the machine on the line 2—2 of Fig. 3.
Figure 3:
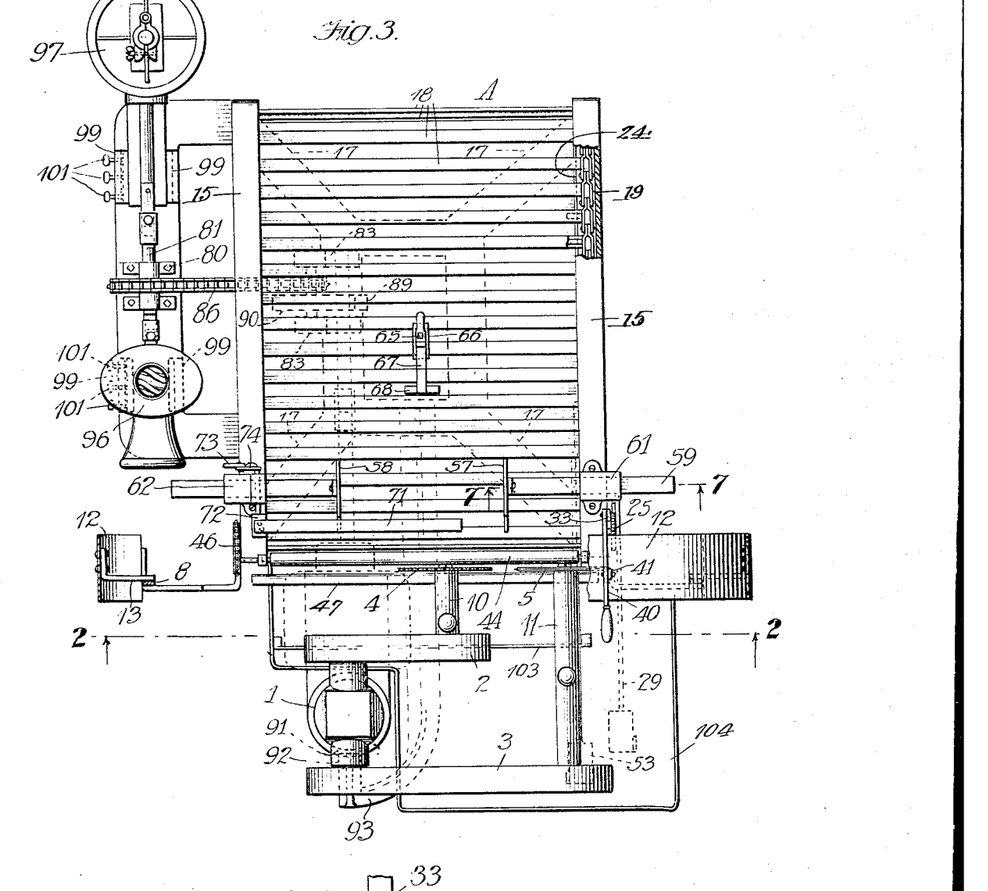
Fig. 3 is a top plan view of the machine, the guide guard and shield being also broken away to expose parts covered thereby.

Mounted in suitable bearings formed in bosses formed at the upper end of upward projections 80 on the shelf or bracket 78 is a shaft 81, which is adapted to be connected with the shaft 82 of the motor 6 in the following manner:—Rotatably mounted in brackets 83 which depend from the under side of the cross frame member 16 are shafts 84 and 85, the shaft 81 being driven directly from the shaft 85 by means of a chain belt 86 adjusted to sprocket wheels 87 and 88, secured to rotate with said shafts 85 and 81, respectively, and the shaft 85 being operatively connected with the shaft 84 by means of gears 89 and 90 secured to rotate with said shafts 84 and 85, respectively. The shaft 84 is so positioned that, by moving the standard 1 into proper pivotal position, said shaft 84 will be brought into alinement with the motor shaft 82 and said standard is adapted to be secured in such pivotal position by means of a pin 91, or the like, adapted to be inserted through an upward projection 92 formed on an arm 93 secured to and which projects frontward from the cross frame member 16, said arm being curved, as shown in Fig. 3, to bring the upward projection 92 thereon at the front side of the standard 1.

Figure 4:
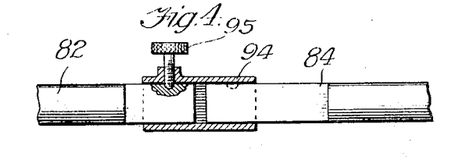
Fig. 4 is an enlarged fragmentary detail view of the coupling for connecting the motor shaft with a driving shaft on the machine frame.
Figure 5:
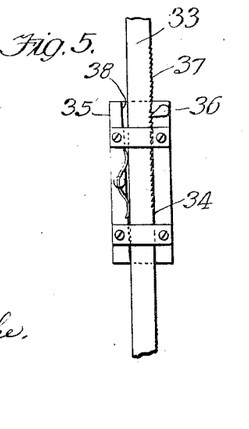
Fig. 5 is an enlarged detail view of the lock for the adjustable stop of the feed device.
Figure 6:
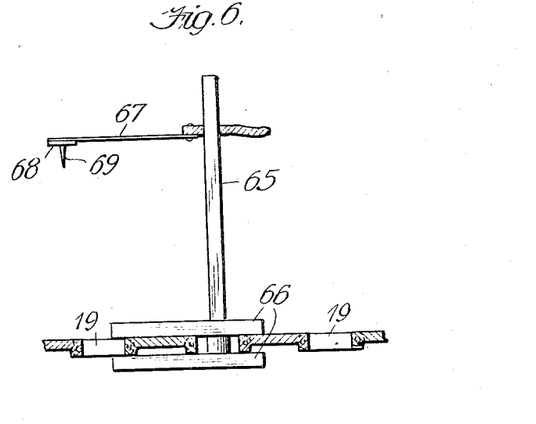
Fig. 6 is a side view of the meat clamp showing the manner of applying said clamp to the conveyer table.
Figure 7:
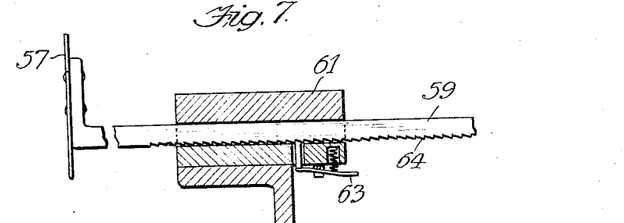
Fig. 7 is an enlarged detail sectional view of the meat guides, taken on the line 7—7 of Fig. 3.
Figure 8:
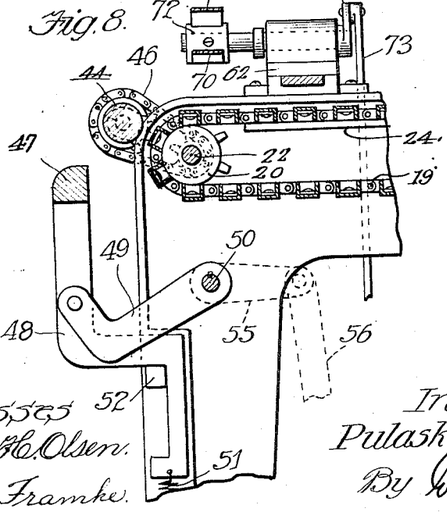
Fig. 8 is an enlarged fragmentary sectional view on the line 8—8 of Fig. 2.

The shaft 84 is adapted to be connected directly to the motor shaft 82 by any suitable coupling. A preferable form of coupling for this purpose is that shown in Fig. 4 of the drawings, which consists of a sleeve 94 formed through which is a square hole or opening which is slidably fitted to the squared end of the shaft 84 and which is adapted to be moved endwise thereon to engage and disengage the same with the end of the motor shaft 82, which is similarly squared, and to be secured in engagement therewith by means of a set-screw or the like 95. To disconnect the shaft 84 and thus the shaft 81 from the motor shaft, it is merely necessary to loosen the set-screw 95 and to withdraw the sleeve 94 from engagement with the squared end of the motor shaft 82. With the described construction, it is obvious that the motor 6 may be readily adapted for driving a machine other than the meat cutter by securing said machine to the shelf or bracket 78 and coupling the driving shaft thereof to the shaft 81.

In the drawings I have shown two machines, a meat grinder indicated at 96 and a bone grinder indicated at 97 secured to the shelf or bracket 78 with their shafts in alinement with the shaft 81 and adapted to be coupled thereto so as to rotate therewith. As shown, the couplings for connecting the shaft 81 with the shafts of the meat and bone grinders 96 and 97 are similar in construction to the coupling 94 for connecting the shaft 84 with the motor shaft 82.

While my invention contemplates any desired means for securing the grinders 96 and 97 to the shelf or bracket 78, I prefer the construction shown, which consists of T-grooves 98 formed in raised marginal portions 99 of the shelf or bracket 78, said T-grooves being adapted to receive flanges 100 formed on the bases of the meat and bone grinders 96 and 97. Set-screws 101 threaded through the raised portions 99 on one side of the machine, the inner ends of which are adapted to be turned into strong engagement with the bases of the grinders 96 and 97 afford convenient means for securing said grinders rigidly to said shelf or bracket 78.

In slicing certain meats, as a side of bacon, it generally is preferred that the slicing shall be done in such manner that the rind will not be cut so that the bacon, when sliced, will still adhere to the rind and may be detached as desired for use. In the preferable construction shown, this is effected in the following manner:—Secured to and depending from the arm of meat cutter 5, is a projection 102, the lower end of which is adapted to rest and ride upon a track 103 supported on a rigid part of the machine frame, as shown the shelf 104 upon which the severed pieces of meat fall. As shown a roller 105 is mounted in the lower end of the projection 102, which runs upon the track 103, thus causing the machine to run easier.

When not desired for use the track 103 may be removed.

106 designates the starting box for the motor 6.

I claim:—

1. In a meat cutting machine, the combination with a movable meat support and feeding means therefor, of means for defining and regulating the feed imparted to said meat support, said means comprising stops which project into the path of movement of a movable member of said feeding means, a bar supported so as to be movable endwise which carries one of said stops, and means for securing said stop bar in different adjusted positions, substantially as described.

2. In a meat cutting machine, the combination with a movable meat support and feeding means therefor, of means for defining and regulating the feed imparted to said meat support, said means comprising stops which project into the path of movement of a movable member of said feeding means, a bar supported so as to be movable endwise which carries one of said stops, a lever connected to said stop bar adapted for imparting endwise movement thereto, and means for securing said stop bar in different adjusted positions, substantially as described.

3. In a meat cutting machine, the combination with a movable meat support and feeding means therefor, of means for defining and regulating the feed imparted to said support, said means comprising stops which project into the path of movement of a movable member of said feeding means, a bar which carries one of said stops, guides in which said bar is movable endwise, a lever connected to said bar adapted for imparting endwise movement thereto, and means for securing said stop bar in different adjusted positions, substantially as described.

4. In a meat cutting machine, the combination with a movable meat support and feeding means therefor, of means for defining and regulating the feed imparted to said support, said means comprising stops which project into the path of movement of a movable member of said feeding means, a bar on which one of said stops is carried, guides for said bar constructed and arranged to permit both endwise and lateral movement thereof, and a catch for securing said bar in different adjusted positions engagement and disengagement of which is adapted to be effected by lateral movement of said bar, substantially as described.

5. In a meat cutting machine, the combination with a movable meat support and feeding means therefor, of means for defining and regulating the feed imparted to said support, said means comprising stops which project into the path of movement of a movable member of said feeding means, a bar which carries one of said stops, guides for said bar constructed and arranged to permit both endwise and lateral movement thereof, a catch for securing said bar in different adjusted positions engagement and disengagement of which is adapted to be effected by lateral movement of said bar, and a spring applied to said bar for maintaining said catch in engagement, substantially as described.

6. In a meat cutting machine, the combination with a movable meat support and feeding means therefor, of means for defining and regulating the feed imparted to said support, said means comprising stops which project into the path of movement of a movable member of said feeding means, a bar on which one of said stops is carried, guides for said bar constructed and arranged to permit both endwise and lateral movement thereof, a catch for securing said bar in different adjusted positions engagement and disengagement of which is adapted to be effected by lateral movement of said bar, a spring applied to said bar for maintaining said catch in engagement, and a lever connected to said bar adapted for imparting endwise movement thereto and for retracting said bar laterally to effect disengagement of the catch for securing said bar in adjusted position, substantially as described.

7. In a meat cutting machine, the combination with a movable meat support and feeding means therefor, of means for defining and regulating the feed imparted to said support, said means comprising stops which project into the path of movement of a movable member of said feeding means, a bar on which one of said stops is carried, guides for said bar constructed and arranged to permit both endwise and lateral movement thereof, a catch for securing said bar in different adjusted positions, engagement and disengagement of which is adapted to be effected by lateral movement of said bar, a spring applied to said bar for maintaining said catch in engagement, and a lever connected to said bar adapted for imparting endwise movement thereto and for retracting said bar laterally to effect disengagement of the catch for supporting said bar in adjusted position, the fulcrum bearing of said adjusting lever comprising a slot whereby said lever is movable both pivotally and bodily endwise and is adapted for imparting both endwise and lateral movement to said bar, substantially as described.

8. A meat supporting table for a meat cutting machine, comprising a frame, an endless conveyer mounted thereon, means for imparting step by step movement to said conveyer, and a roller rotatably mounted at the front end of said conveyer, substantially as described.

9. A meat supporting table for a meat cutting machine, comprising a frame, an endless conveyer mounted thereon, means for imparting step by step movement to said conveyer, a roller rotatably mounted at the front end of said conveyer, and means for rotating said roller, substantially as described.

10. A meat supporting table for a meat cutting machine, comprising a frame, an endless conveyer mounted thereon, means for imparting step by step movement to said conveyer, a roller rotatably mounted at the front end of said conveyer at the rear side of the meat cutting devices, and a vertically movable auxiliary meat support coöperating with said roller and the meat cutting devices, the normal position of said auxiliary support being below said roller, and means for raising said support, substantially as described.

11. A meat supporting table for a meat cutting machine, comprising a frame, an endless conveyer mounted thereon, means for imparting step by step movement to said conveyer, a pivoted clamping arm or arms which extend over the conveyer and are adapted for holding the meat thereon during the cutting operation, means for maintaining said clamping arm or arms normally raised and foot operated means for depressing said arm or arms, substantially as described.

12. A meat supporting table for a meat cutting machine, comprising a frame, an endless conveyer mounted thereon, means for imparting step by step movement to said conveyer, a pivoted clamping arm or arms of resilient material which extend over said conveyer and are adapted for holding the meat during the cutting operation, means for maintaining said clamping arm or arms normally raised and foot operated means for depressing said arm or arms, substantially as described.

13. A meat supporting table for a meat cutting machine, comprising a frame, an endless conveyer mounted thereon, means for imparting step by step movement to said conveyer, a pivoted clamping arm or arms which extend over the conveyer and are adapted for holding the meat thereon during the cutting operation, means for maintaining said clamping arm or arms normally raised and means for depressing said arm or arms, a vertically movable auxiliary meat support at the front end of the conveyer, the normal position of which is below the top of said conveyer, and means for raising said support, substantially as described.

14. A meat supporting table for a meat cutting machine, comprising a frame, an endless conveyer mounted thereon, means for imparting step by step movement to said conveyer, a pivoted clamping arm or arms which extend over the conveyer and are adapted for holding the meat thereon during the cutting operation, a vertically movable auxiliary meat support at the front end of the conveyer, means for maintaining said clamping arm or arms normally raised and said auxiliary meat support normally depressed, and means for simultaneously depressing said clamping arms and for raising said auxiliary meat support, substantially as described.

15. A meat supporting table for a meat cutting machine, comprising a frame, an endless conveyer mounted thereon, means for imparting step by step movement to said conveyer, a pivoted clamping arm or arms of resilient material which extend over said conveyer and are adapted for holding the meat during the cutting operation, a vertically movable auxiliary meat support at the front end of the conveyer, means for maintaining said clamping arms normally raised and said auxiliary meat support normally depressed, and co-acting means for simultaneously depressing said clamping arms and for raising said auxiliary meat support, substantially as described.

16. A meat supporting table for a meat cutting machine, comprising a frame, an endless conveyer mounted thereon, means for imparting step by step movement to said conveyer, and means supported independently of said conveyer for guiding the meat to the cutting devices, said means comprising rods secured to the machine frame which project over the conveyer table and which are adjustable endwise, plates secured to the ends of said rods, and means for securing said rods in desired endwise adjustments, substantially as described.

17. A meat supporting table for a meat cutting machine, comprising a frame, an endless conveyer mounted thereon, means for imparting step by step movement to said conveyer, and means supported independently of said conveyer for guiding the meat to the cutting devices, said means comprising rods secured to the machine frame which project over the conveyer table and which are adjustable endwise, plates secured to the ends of said rods, and means for securing said rods in desired endwise adjustments, said means comprising ratchet teeth formed on said rods and pawls mounted on the frame of the machine adapted to engage said ratchet teeth, substantially as described.

18. In a meat cutting machine, the combination of a pivoted standard, meat cutting devices thereon, a motor mounted on said standard for driving the cutting devices, means for securing said standard against oscillation, a shaft mounted on the frame of the machine, and means for connecting said shaft to and disconnecting it from the shaft of said motor, substantially as described.

19. In a meat cutting machine, the combination of a pivoted standard, meat cutting devices thereon, a motor mounted on said standard for driving said cutting devices, means for securing said standard against oscillation, a shelf or support on the frame of the machine, means for securing a machine to said shelf or support, a shaft rotatably mounted in bearings on said shelf or support, means for connecting and disconnecting the shaft of a machine secured to said shelf or support with the shaft mounted on said support, and said latter shaft with the motor shaft, substantially as described.

20. In a meat cutting machine, the combination of a pivoted standard, meat cutting devices thereon, a motor mounted on said standard for driving said cutting devices, means for securing said standard against oscillation, a shelf or support on the frame of the machine, means for securing a machine to said shelf or support, shafts, one rotatably mounted in bearings on said shelf or support adapted to be connected to and disconnected from a shaft secured to said shelf or support, and the other rotatably mounted in bearings on the frame of the machine and adapted to be connected to and disconnected from the motor shaft, and driving connection between said first and second shafts, substantially as described.

In testimony that I claim the foregoing as my invention, I affix my signature in presence of two subscribing witnesses this 5th day of June, A. D. 1915.

PULASKI J. BRYAN.

Witnesses:
  ALEX. D. KING, Jr.,
  F. M. REICHEL.